June 13, 1933.  E. FROESÉ  1,914,247

DECORATED UREA WARE AND PROCESS OF PRODUCING SAME

Filed March 1, 1932

Inventor
Edmund Froese

Witness
H. Woodard

By H.Q. Wilson Yeo
Attorneys

Patented June 13, 1933

1,914,247

UNITED STATES PATENT OFFICE

EDMUND FROESÉ, OF BROOKLYN, NEW YORK

DECORATED UREA WARE AND PROCESS OF PRODUCING SAME

Application filed March 1, 1932. Serial No. 596,133.

The invention relates to the decoration of shaped or molded products composed essentially of urea resins, these resins being, as well known, condensation products of urea or thiourea with formaldehyde. Such products commonly known as urea ware, are quite extensively manufactured in the form of table and kitchen articles, boudoir and toilet articles, articles for personal adornment, etc. Such urea ware articles have heretofore been marketed in various colors and have in numerous instances been decorated with decalcomanias, lacquers, oil pigments, etc. applied only to the surface of the ware. Such decorations have been subject to injury in packing and unpacking, by repeated handling in stores, by continued use, etc.

It has been my desire to provide some adequate way of decorating urea resin products in a manner to overcome such prior drawbacks as above stated and at the same time to provide a decoration having an unusually attractive appearance.

From a standpoint of appearance, I have found that a decoration partly in intaglio bordered by a margin in relief, produces a very pleasing effect, particularly when the intaglio is of a rather dark color or shade compared with that of the article decorated, but I have been confronted with the problem of creating the desired appearance in an industrially practicable way.

I have further found from a standpoint of appearance, that a decoration, in intaglio, of fairly dark shade or color, bordered by a relatively light margin, will give pleasing results, and here again the problem has been to provide for the practicable production of the desired appearance.

I have still further found that the best appearance is obtained when forming the decoration by combining the characteristics set forth in the two immediately preceding paragraphs, and I have therefore met with the composite problem of providing in an industrially practicable way, for the production of a decoration in dark intaglio bordered by a light margin in relief.

In addition to the above problems relating to practicable production of appearance, I have been confronted equally with the question of practicably obtaining effective durability of colors or shades used in producing the decoration.

I have finally discovered after repeated experiments that all of the above problems may be successfully solved in a surprisingly simple manner. My experiments show that urea ware will scorch upon pressure against a sufficiently hot body, that it will swell if allowed to absorb sufficiently intense heat, that the colored urea products will bleach if allowed to absorb sufficiently intense heat, and that a body sufficiently hot to scorch or burn into the urea ware, will supply sufficient heat to swell and bleach the material along the margins of the areas scorched or burned. I therefore need only heat a properly shaped die to a temperature which will cause it to burn into the urea ware, press this hot die and the ware firmly together until the die has burned into or scorched the ware, and then discontinue this burning operation. By so doing, four effects are obtained. 1. The die forms the intaglio in the ware. 2. The die scorches the ware where it contacts therewith and hence imparts to the intaglio a dark color. 3. The heat absorbed by the ware along the margins of the intaglio, swells the ware and produces a border in relief. 4. This absorbed heat bleaches the swollen border. Thus, by the simple operations defined, I produce the desired results.

In the manufacture of colored plastic products, such as urea products, I am informed that for transparent plastics, dyes alone are used and they are the same dyes commonly used for fabric dyeing; for translucent plastics, the same kinds of dyes are mixed in desired proportions with dry pigments such as those ordinarily used in house paints and tube oil colors; and for opaque plastics these pigments are used alone. The bleaching which takes place when practicing my invention, may be due to the action of the die heat alone on the coloring matter but I am not certain that such is the case. I do know however that when practicing the invention on the urea products herein mentioned, conspicuous bleaching results.

For the die, brass or any other appropriate material is used. This die is heated by any desired means which will not deposit soot and the like upon its working face. The heating is preferably to a temperature ranging from 1000° to 1200° Fahrenheit and the hot die and the ware are held in contact preferably for about four seconds. During this contact, an oily fluid exudes from the ware around the die and such fluid is wiped off with a damp cloth after the burning operation. The ware must be pressed firmly but with no considerable pressure against the die and held there over a sufficient period to permit the design of the die to burn into the surface and to permit the heat absorbed by the ware along the margins of the intaglio to cause such portions to swell and to bleach. The period of contact will depend upon the heat of the die and the amount of area in the design to be burned in. Where the design on the die is composed of fine lines a shorter period of contact is necessary than when the design has large solid areas that are to be burned in. It is also obvious that the hotter the die, the shorter the period of contact necessary. However, the die must be relatively hot and not held too long in contact with or close to the ware because otherwise the heat radiated from the body of the die will cause large areas of discoloration beyond the margins of the intaglio and thus ruin the design. If the die is not sufficiently hot to quickly burn in those portions of the design which are to be burned in the ware, it must be held against the ware so long in order to cause the burning of the intaglio that large areas beyond the margins of the intaglio will be discolored and the ware will be ruined. I have obtained the best results by shaping the design of the die to conform to the surface to be decorated, heating the die to a temperature of about 1200° F. and quickly moving the ware toward and from the die so that all portions of the design of the die substantially simultaneously contact with and separate from the ware. The latter operation prevents the heat radiated from the body of the die from discoloring large areas outside of the design which is to be applied.

The urea ware is manufactured in different kinds. When decorating some of these kinds, the scorching produced by the die is a dark brown, almost a black, in others different shades of brown and in still another, almost white. The intaglio in a brown, usually requires no further coloring and both this intaglio and the bleached marginal portion which is usually substantially white, are of permanent appearance and not subject to injury even with rough handling or extended use. The almost white intaglio may be allowed to so remain but better appearance is usually obtained if it be suitably colored for instance with turpentine and Japan, or turpentine and oil color. Moreover, when burning-in on some kinds of the ware, while brown scorching is produced, some of the scorched material adheres to and is withdrawn with the die, and it is then advisable to touch-up the intaglio with appropriate color. This may be easily done by wiping over the design with a cloth saturated by suitable coloring material, such as the turpentine and Japan or the turpentine and oil color above mentioned.

To more clearly illustrate the artistic appearance of a urea product decorated in accordance with the invention, reference may be had to the accompanying drawing showing a decorated tumbler.

Figure 1:
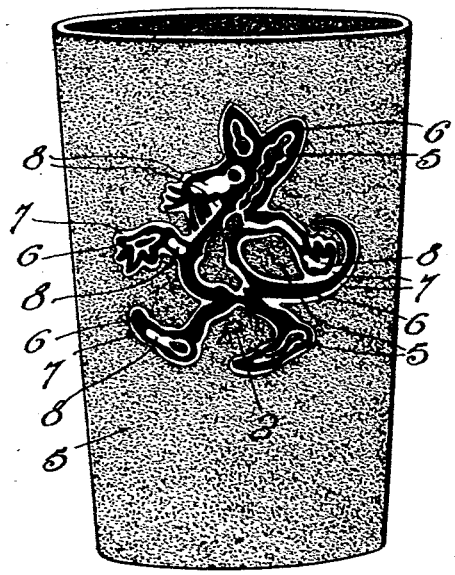
Fig. 1 is a perspective view.
Figure 2:
Fig. 2 is an enlarged detail sectional view on line 2—2 of Fig. 1.

In the drawing, the light stippling 5 in Fig. 1 denotes the surface of a urea ware tumbler, and the latter may be considered as of any color or shade. The burned-in intaglio is shown at 6 and the heavy stippling thereof in Fig. 1 represents the scorching imparted thereto, or the coloring matter applied. The swollen and bleached border along the margins of the intaglio, forming the relief portion of the decoration, is shown at 7, being left white in Fig. 1. In this view, any relatively large white areas such as 8, represent additional bleaching which takes place where the die effects sufficient concentration of heat adjacent its contact with the ware.

I claim:—

1. In a process of decorating colored urea ware which will bleach under heat, the application of a bleaching heat where decorative elements are required.

2. In a process of decorating colored urea ware which will swell and bleach under heat, the application of heat sufficient to bleach and swell where decorative elements are required.

3. Decorated colored urea ware having intaglio portions bordered by bleached marginal portions.

4. Decorated colored urea ware having intaglio portions bordered by bleached relief portions.

5. Decorated colored urea ware having a bleached decorative portion.

6. Decorated colored urea ware having a swollen and bleached decorative portion.

7. A process of decorating colored urea ware which will scorch under contact with a sufficiently hot object and will bleach under heat insufficient to scorch, comprising the steps of heating a die to a temperature which will scorch the urea ware, and pressing the hot die and the ware together, until the die scorches the ware and the latter bleaches along the margins of the scorched areas.

8. A process of decorating, partly in intaglio and partly in relief, a urea ware which will scorch under contact with a sufficiently hot object and will both swell and bleach under heat insufficient to scorch, comprising the steps of heating a die to a temperature at which it will burn into the urea ware, and pressing the ware and the hot die together, until the hot die burns intaglio into the ware and the latter both swells into relief and bleaches along the margins of the intaglio.

9. A process of decorating colored urea ware which will scorch under contact with a sufficiently hot object and will bleach under heat insufficient to scorch, comprising the steps of forming a die with a design shaped to conform to the surface to be decorated, heating the die to a temperature at which it will scorch the urea ware, pressing the hot die and the ware together to cause substantially the entire design to simultaneously contact with the ware, and maintaining such contact until the die scorches the ware and the latter is bleached along the margins of the scorched areas.

10. A process of decorating, partly in intaglio and partly in relief, a urea ware which will scorch under contact with a sufficiently hot object and will both swell and bleach under heat insufficient to scorch, comprising the steps of forming a die with a design shaped to conform to the surface to be decorated, heating the die to a temperature at which it will burn into the urea ware, pressing the ware and the hot die together to cause substantially the entire design to simultaneously contact with the ware, and maintaining such contact until the hot die burns intaglio into the ware and the latter both swells into relief and bleaches along the margins of the intaglio.

In testimony whereof I affix my signature.

EDMUND FROESÉ.